(12) United States Patent
Allen

(10) Patent No.: US 9,583,927 B2
(45) Date of Patent: Feb. 28, 2017

(54) TRIM PLATE WITH RETRACTABLE HOOK ARM

(71) Applicant: BeaconMedaes LLC, Rock Hill, SC (US)

(72) Inventor: Mark Allen, Charlotte, NC (US)

(73) Assignee: BEACONMEDAES LLC, Rock Hill, SC (US)

( * ) Notice: Subject to any disclaimer, the term of this patent is extended or adjusted under 35 U.S.C. 154(b) by 19 days.

(21) Appl. No.: 14/707,029

(22) Filed: May 8, 2015

(65) Prior Publication Data

US 2015/0325991 A1    Nov. 12, 2015

Related U.S. Application Data

(60) Provisional application No. 61/990,237, filed on May 8, 2014.

(51) Int. Cl.
  *H02G 3/02* (2006.01)
  *H02G 3/14* (2006.01)
  *H02G 3/08* (2006.01)

(52) U.S. Cl.
  CPC .............. *H02G 3/14* (2013.01); *H02G 3/081* (2013.01)

(58) Field of Classification Search
  USPC ....... 220/3.7, 3.8, 241, 242, 254.3; 221/100; 174/66, 67; 248/205.2, 205.3, 206.5, 301
  See application file for complete search history.

(56) References Cited

U.S. PATENT DOCUMENTS

| | | | | | |
|---|---|---|---|---|---|
| 402,211 | A | * | 4/1889 | Ware | A47G 25/0685 211/104 |
| 434,343 | A | * | 8/1890 | Katherman | A47G 25/065 211/96 |
| 882,277 | A | * | 3/1908 | Teipel | A47G 25/0685 211/100 |
| 943,340 | A | * | 12/1909 | Clift | A47G 25/065 211/87.01 |
| 1,318,257 | A | * | 10/1919 | Hansen | A47G 25/0685 211/99 |
| 2,068,285 | A | * | 1/1937 | Bierman | A47G 25/0685 211/104 |
| 2,071,257 | A | * | 2/1937 | Hansen | A47G 25/065 224/927 |
| 2,244,937 | A | | 6/1941 | Brainard | |
| 2,943,138 | A | * | 6/1960 | Reager | H01R 13/72 174/481 |

(Continued)

FOREIGN PATENT DOCUMENTS

DE    202009009881    10/2009
EP      2508695      10/2012
GB     1005910 A      9/1965

*Primary Examiner* — J. Gregory Pickett
*Assistant Examiner* — Gideon Weinerth
(74) *Attorney, Agent, or Firm* — Parsons Summa

(57) ABSTRACT

A trim plate is disclosed that includes a base plate, a folding hook arm pivotally attached to the base plate, and a weight-bearing truss that supports the folding hook arm. A first end of the weight bearing truss is pivotally connected to the hook arm at about the middle of the hook arm and the second end of the truss is positioned in a primary slot in the base plate. Two secondary slots in the base plate are positioned on either side of the primary slot, and pins extend perpendicularly from the base plate end of the truss and fit in the secondary slots for sliding therein whenever the hook arm is open or closed.

10 Claims, 7 Drawing Sheets

(56) References Cited

U.S. PATENT DOCUMENTS

| | | | | |
|---|---|---|---|---|
| 3,113,996 | A * | 12/1963 | Sanford | H01R 13/60 174/67 |
| 3,941,250 | A * | 3/1976 | Ott | A47G 25/0685 211/1.3 |
| 4,171,748 | A * | 10/1979 | Fabian | A47G 25/0685 211/1.3 |
| D259,228 | S * | 5/1981 | Fabian | D6/324 |
| 4,335,863 | A * | 6/1982 | Rapps | A47G 29/08 174/66 |
| D402,271 | S * | 12/1998 | Weinberg | D13/177 |
| D405,347 | S * | 2/1999 | Mezey | D13/177 |
| 5,950,845 | A * | 9/1999 | Harris | A47G 25/0671 211/100 |
| 6,036,536 | A | 3/2000 | Chiu | |
| 6,130,384 | A * | 10/2000 | Esteves | A47G 25/0607 174/66 |
| 6,901,779 | B2 * | 6/2005 | Magee | A45C 11/325 109/23 |
| 7,458,479 | B1 * | 12/2008 | Thompson | H02G 3/14 220/242 |
| D617,173 | S * | 6/2010 | Anzalone | A47G 29/10 D8/353 |
| D709,358 | S * | 7/2014 | Fugett | D8/380 |
| 9,016,642 | B1 * | 4/2015 | Ay | F16B 45/00 248/205.1 |
| 9,022,336 | B2 * | 5/2015 | Huynh | A47G 29/10 174/66 |
| D735,707 | S * | 8/2015 | Dobben | D14/251 |
| D756,754 | S * | 5/2016 | Allen | D8/367 |
| 2003/0141423 | A1 * | 7/2003 | Gordon | A47G 25/065 248/304 |
| 2005/0061940 | A1 | 3/2005 | Brnjac | |
| 2005/0109528 | A1 * | 5/2005 | Mallen | H02G 3/14 174/66 |
| 2008/0116157 | A1 | 5/2008 | Fulbrook | |
| 2010/0320345 | A1 * | 12/2010 | Huang | A47G 25/0635 248/308 |
| 2011/0177704 | A1 | 7/2011 | Siu | |
| 2011/0303433 | A1 * | 12/2011 | Wagner | A47G 29/10 174/66 |
| 2015/0325991 | A1 * | 11/2015 | Allen | H02G 3/081 220/3.7 |
| 2015/0349504 | A1 * | 12/2015 | Allison | H02G 3/081 174/66 |

\* cited by examiner

TRIM PLATE WITH RETRACTABLE HOOK ARM

BACKGROUND

The invention relates to wall fixtures in facilities such as hospital rooms. In most cases, wire, cable or tubing attached to a wall or ceiling receptacle is longer than the immediate need. Typically, any excess is allowed to simply drape onto the floor or along the wall. This is particularly undesirable when the receptacle is in plain sight or (as often happens in medical settings) is located above and over the patient In medical facilities, there is an additional situation involving a standard "set up" of tubing and cannulae that is prepared prior to a patient arriving in a room. This tubing must be connected to the outlet or therapy equipment (flowmeter or suction regulator) at one end but otherwise somehow stored until needed. Typically, this is accomplished by coiling the tubing, loosely placing it back in its original bag and hanging it on the flowmeter or stuffing it behind the suction regulator.

These methods present disadvantages because the tubing (which should remain at least clean and in many cases sterile) is not secure, can easily fall away and drag on the floor or the bed, or detach from the equipment, or (worst) fall on the patient The coiled and bagged tubing also blocks visual inspection of the flowmeter and regulator, making it difficult to confirm that the flow is off when the outlet is not in use, or to adjust the flowmeter when the tubing is in use.

As an additional factor, in the medical context, most physical spaces are crowded for the sake of efficiency, or in some cases necessity. Because of that, the value of new items that occupy physical space must be justified by a significant functional advantage.

Therefore a need exists for a convenient fixture that would help store tubing and similar items in a manner that helps keep the items clean, or even sterile, that does not otherwise interfere with the necessary medical functions of the room itself, and that potentially enhances those medical functions.

SUMMARY

The invention is an improved trim plate that can replace conventional trim plates at most standard electrical receptacles ("boxes"), network connection receptacles, antennae connections, light switches, medical gas terminal units or any other application that uses a trim plate for aesthetic or functional purposes.

In one aspect, the trim plate includes a folding hook arm and a truss that supports the folding hook arm. In particular, in addition to the folding hook arm, the new plate has an additional weight-bearing truss that is flush or almost flush with the plate when closed, opens when the hook arm opens, and retracts when the hook arm retracts. As used herein the term "hook " is used to describe a function rather than a particular (e.g., curled) shape.

One end of the weight bearing truss is pivotally connected to the retracting hook arm at about the middle of the hook arm. The other end of the truss is positioned in a primary slot in the faceplate and below the hook arm. Two secondary slots are positioned on either side of the primary slot. Pins extend perpendicularly from the plate end of the truss and fit in and slide in these secondary slots whenever the hook arm is open or closed.

The resulting structure provides a retractable hook arm and a retractable weight-bearing truss for the main hook arm.

The foregoing and other objects and advantages of the invention and the manner in which the same are accomplished will become clearer based on the followed detailed description taken in conjunction with the accompanying drawings.

DETAILED DESCRIPTION

Figure 1:
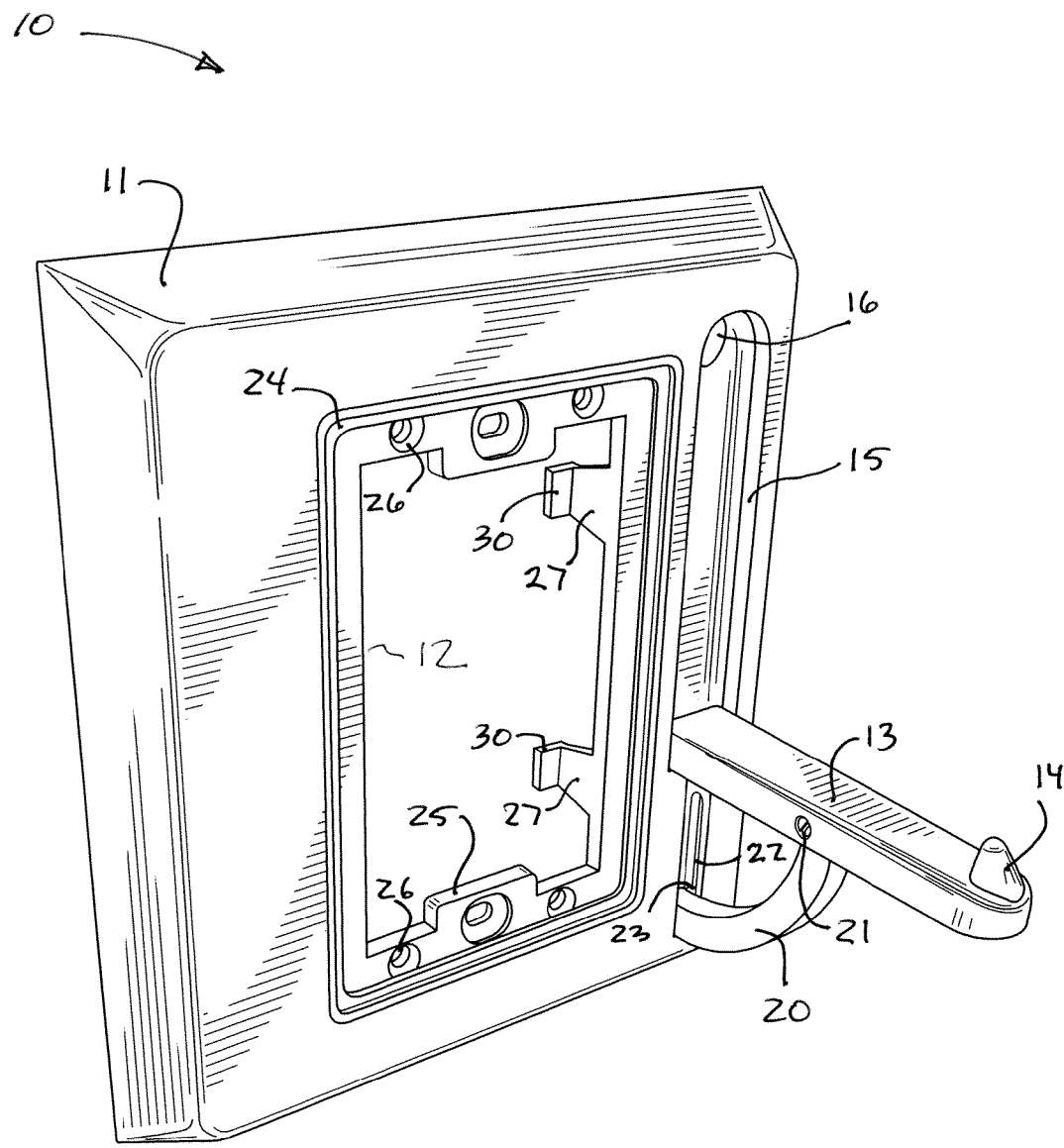
FIG. 1 is a perspective view of a trim plate according to the invention.

FIG. 1 is a perspective view of a trim plate broadly designated at 10 according to the present invention. The trim plate includes a rectangular base plate 11 which defines a rectangular opening 12, substantially centered in the base plate and that provides access to the items in a wall or panel (not shown) behind the trim plate 10. The rectangular shape tends to match many, or even most, styles of small receptacles, but is not functionally required. Other perimeter shapes may be entirely appropriate in other circumstances. Similarly, the rectangular shape of the opening 12 is exemplary rather than limiting.

Figure 3:
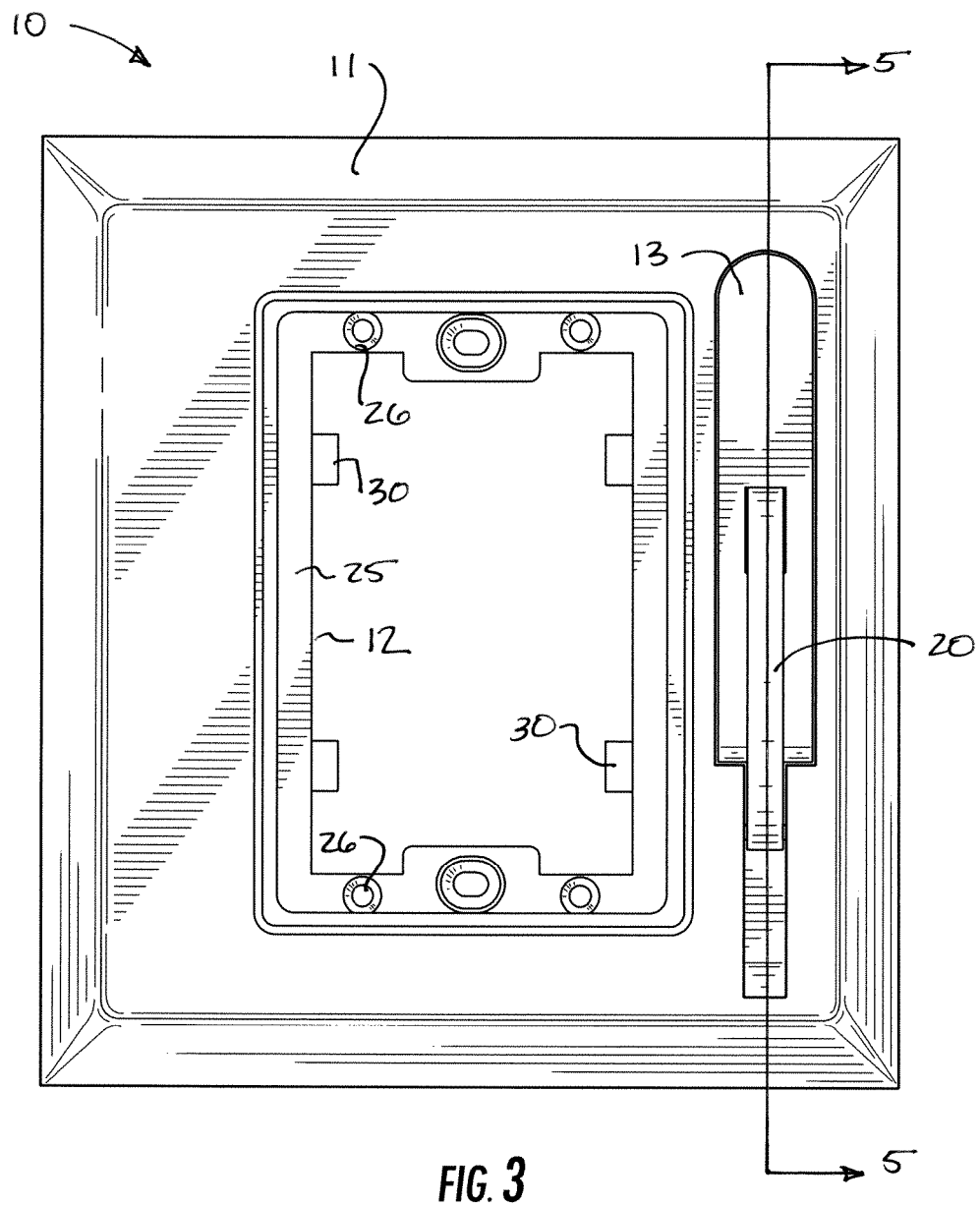
FIG. 3 is a front elevation overview of the trim plate of FIGS. 1 and 2.
Figure 4:
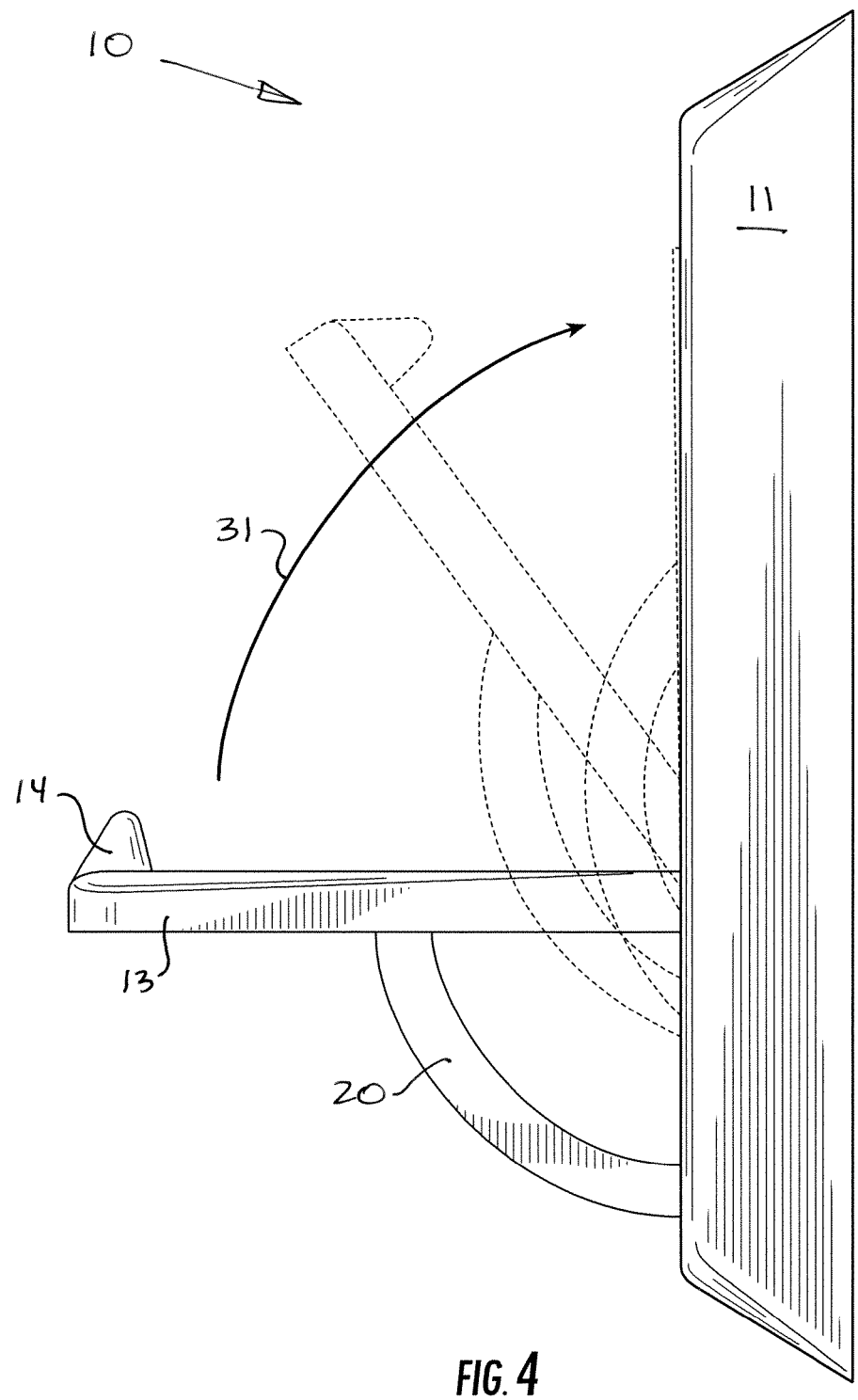
FIG. 4 is a side elevation view of the trim plate of FIGS. 1-3.
Figure 5:
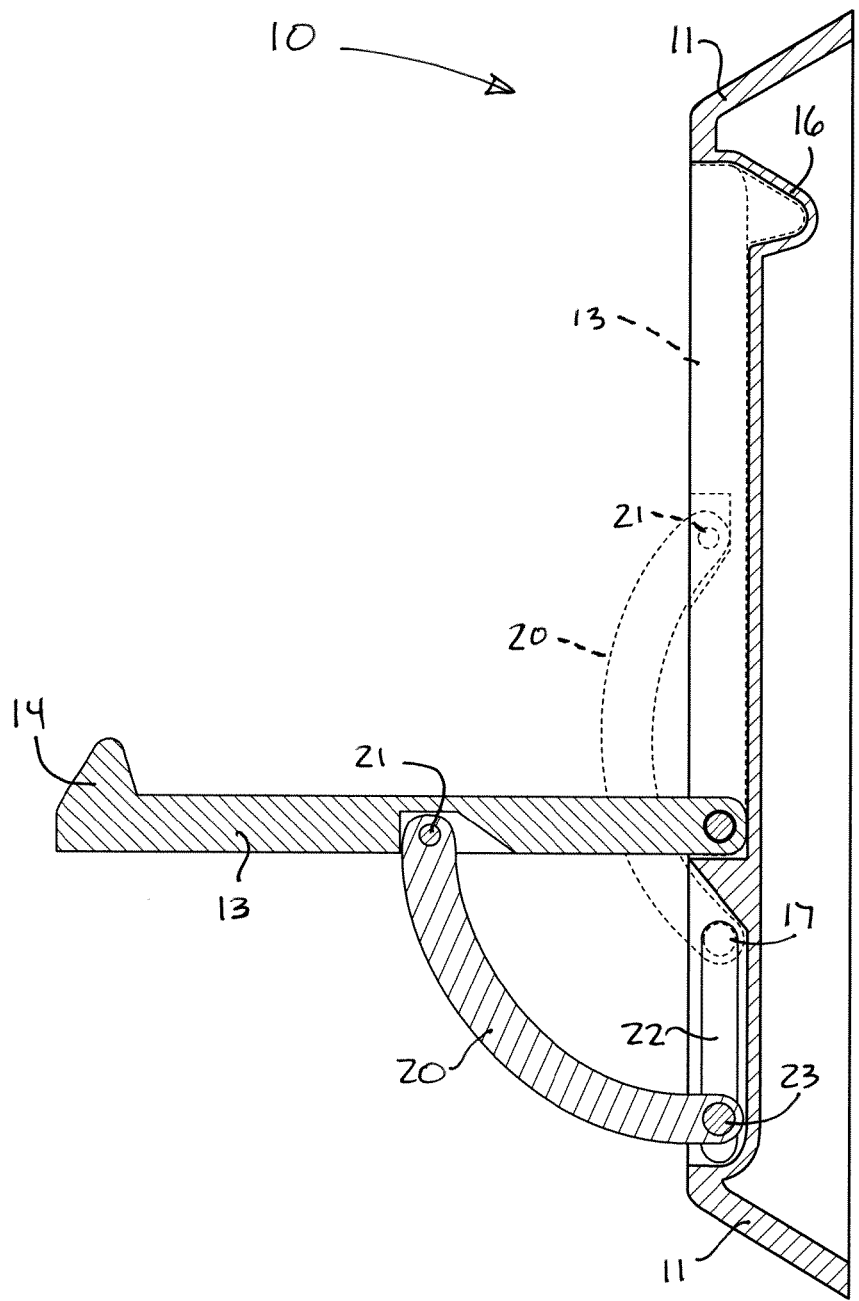
FIG. 5 is a cross-sectional view of the trim plate of FIGS. 1-4 taken along line 5-5 of FIG. 3.

A folding (or retracting) hook arm 13 is mounted to pivot relative to the base plate 11 (e.g. FIGS. 2-5). The pivoting structure and elements are best illustrated in FIG. 5 hereafter. The arm 13 optionally includes a projection or lug 14 that helps prevent certain items (such as wires and tubing) from sliding off the distal end of the hook arm arm 13. The hook arm 13 can fold or retract into a hook arm seat 15 in the base plate 11 that has a shape corresponding to the hook arm 13. The hook arm seat 15 further includes a lug seat 16 into which the lug 14 can fit when the hook arm 13 is retracted.

The drawings illustrate the folding arm 13 positioned on one side of the base plate 11, but it will be understood that the folding arm 13 could be positioned on either side, or that two arms could be included, and at two positions.

The hook arm 13 is connected to the base plate 11 at an arm pin 17 (that remains stationary; e.g., FIG. 5) and to a truss 20 by an arm truss pin 21. In the illustrated embodiment the truss 20 is in the form of a 90° arc, and the other end of the truss 20 is fixed in a pin slot 22 by a truss pin 23 that can move linearly in parallel pin slots 22 (only one is visible in FIG. 1) when the hook arm 13 pivots on the arm truss pin 21 and retracts into the arm seat 15.

In the illustrated embodiment a gasket 24 is positioned around the opening 12 and helps receive an additional cover plate (not shown) supported by the trim plate 10. The opening 12 is further defined by a pad 25 that supports several counter-bored or counter-sunk holes 26 along with a plurality of rearward extending legs 27 that terminate in perpendicular tabs 30. The trim plate 10 can be fixed in place using fasteners (e.g., machine screws, not shown) in the holes 26.

The gasket 24 is optional depending upon the end use. If present, it can be formed of rubber or other appropriate materials provided they are physically and chemically consistent with the end-use.

Figure 2:
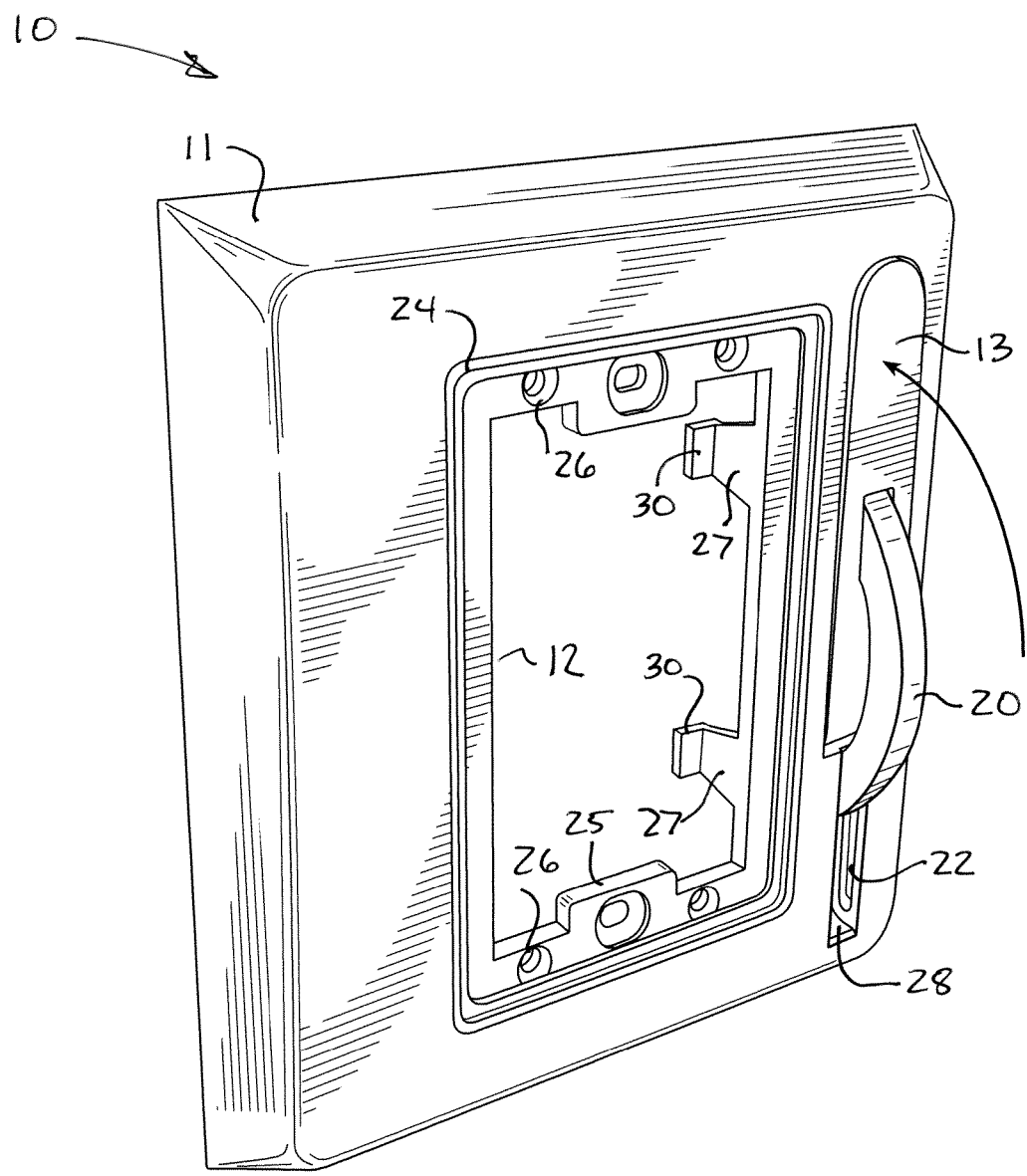
FIG. 2 is a second perspective view of the trim plate of FIG. 1.

FIG. 2 illustrates the same plate as FIG. 1, but with the hook arm arm 13 folded or retracted into the arm seat 15. In this position, and based on the relationship between and among the elements, the truss 20 rests closely adjacent the base plate 11. As FIGS. 2, 4 and 5 illustrate, as the arm 13 pivots into the retracted position, the truss pin 23 slides upwardly in the truss slot 22 while the other end of the truss 20 pivots relative to the folding hook arm 13.

FIG. 2 also provides a clearer view of the primary truss slot 28 within which the truss 20 can move. As both FIG. 1 and FIG. 2 illustrate, the pin slots 23 are formed in the side walls of the primary truss slot 28.

The other elements in FIG. 2 are the same as in FIG. 1 and are numbered in the same manner.

FIG. 3 is a front elevational view of the trim plate 10 and with the folding hook arm 13 in the same retracted position as illustrated in FIG. 2. Again, the remaining elements illustrated in FIG. 3 are the same as those in FIGS. 1 and 2 and are accordingly numbered in the same fashion.

FIG. 4 is a side elevational view of the trim plate 10 and illustrates the relative movement of the folding hook arm 13 as it moves from the open position (solid lines) through an arc of movement indicated by the arrow 31 and the dotted lines.

FIG. 5 is a cross-sectional view that helps illustrate the moving parts of the arm and truss. In particular, FIG. 5 is a more detailed view of the three pivot items: the arm pin 17, the arm truss pin 21, and the plate truss pin 23. FIG. 5 helps illustrate the manner in which the truss pin 23 and the base plate 11 permit the truss to pivot relative to the base plate, and permit the truss to slide in the truss slot 22 relative to the baseplate 11.

FIG. 5 correspondingly illustrates that the folding hook arm arm 13 pivots on the arm pin 17 relative to the baseplate 11, and pivots on the truss pin arm 21 during the retracting (or opening) motion.

Figure 6:
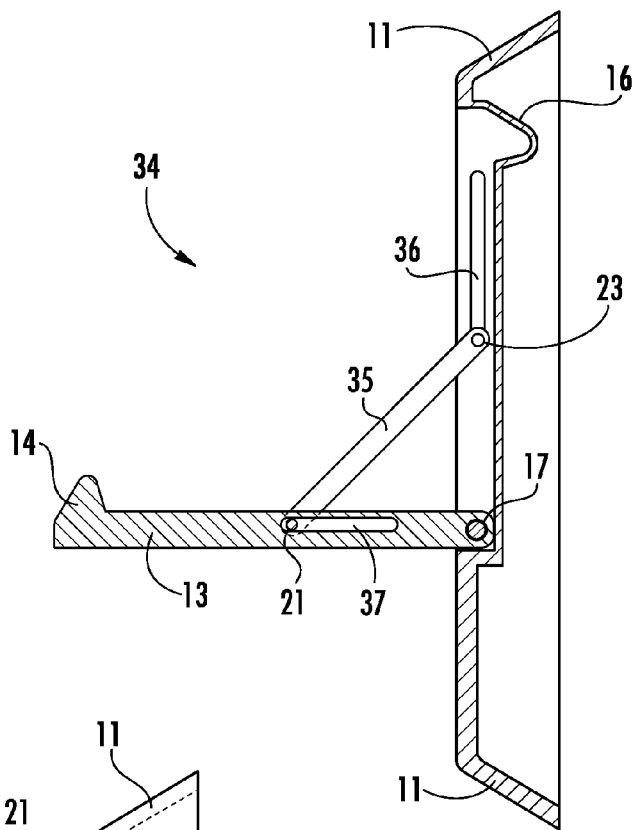
FIG. 6 is a cross-sectional view of a second embodiment of a trim plate according to the invention.

FIG. 6 is a cross-sectional view of a second embodiment of the trim plate and broadly designated at 34. Items common to the previous embodiment are numbered similarly, but items that are rearranged or different have new reference numerals. Accordingly, the trim plate 34 again includes a base plate 11 which has other features common with the first embodiment, but which for the sake of clarity are not repeated (or illustrated) here.

The hook arm 13 is again pivotally fixed to the base plate 11 by the truss pin 23, but in this embodiment, the truss 35 is positioned in upper portions of the base plate 11 rather than the lower portions. The truss 35 is again connected to the base plate by a truss pin 23, and because of its position, the truss pin 23 moves within a differently positioned truss slot 36. In particular, the truss slot 36 is positioned in upper portions of the base plate 11 rather than in lower portions (as in the first embodiment).

The other end of the truss 35 is fixed to the hook arm 13 by a truss pin 21, but in this embodiment the truss pin 21 moves in a slot 37 in the arm 13. The embodiment illustrated in FIG. 6 has the advantage that the hook arm 13 and its lug 14 again fold entirely into the baseplate 11, but in this embodiment the truss 35 likewise retracts entirely into the base plate 11.

Figure 7:
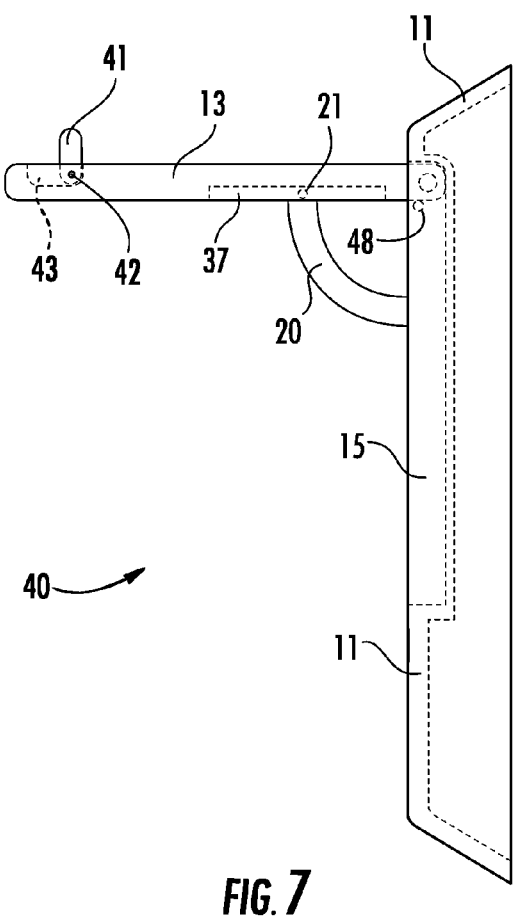
FIG. 7 is a side elevation overview of a third embodiment of a trim plate according to the invention.

FIG. 7 illustrates a third embodiment of the trim plate broadly designated at 40. In this embodiment, the hook arm 13 is positioned near the top of the base plate 11 rather than pivoting from near the bottom. The truss 20 is again connected to the arm 13 by a truss pin 21 in the arm and a truss pin 23 (not visible in FIG. 7) in the base plate 11.

This embodiment also includes a pivoting lug 41 which moves on its lug pin 42 and can retract into a lug seat 43.

The embodiment illustrated in FIG. 7 provides a similar function to the embodiment exemplified in FIGS. 1-5, but by supporting wires and hoses (or any other items) at a position that is adjacent upper portions of the base plate 11 rather than middle or lower portions.

In the embodiment illustrated in FIG. 7, because the hook arm 13 pivots upwardly, the plate and the truss 20 includes a lock 48 or locking mechanism to keep the truss 20 and the arm 13 in place. Well-understood mechanical locks such as ball and detent arrangements and locking pins will work, as will the various spring-type pins. These items are well understood in this and many other arts, are available in numerous designs and versions, and can be selected and incorporated by the skilled person without undue experimentation.

It will also be understood that the slot 37 illustrated in FIGS. 6 and 7 is optional, and that the arm truss pin 21 could provide a fixed rotation point rather than a sliding one. In such cases, the truss pin 23 at the plate 11 serves as a sliding rotation point; i.e., as FIG. 6 already illustrates.

Figure 8:
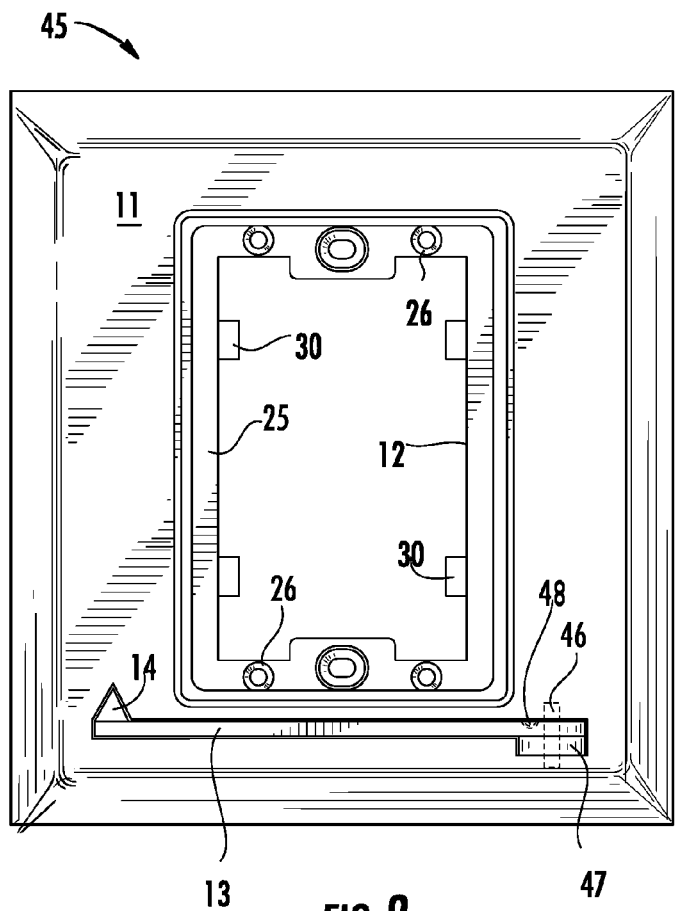
FIG. 8 is a front elevation of you of a fourth embodiment of a trim plate according to the invention.

FIG. 8 is a front elevational view of a fourth embodiment of the trim plate broadly designated at 45. Many of the elements are the same as in FIG. 1, and are numbered accordingly. In the embodiment illustrated in FIGS. 8 and 9, however, the hook arm 13 pivots on a hinge in a horizontal plane rather than in a vertical plane as in the previous embodiments. The hook arm 13 is thus positioned on a pivot pin 46 which is different from the previous embodiments. This provides the opportunity to move the hook arm 13 in a different plane, which may be preferred depending upon the working environment, the geometry of a particular room or facility, or other circumstances.

Appropriate hinges and hinge designs are well known and widely available in this and other arts, with gate-type hinges and door-type hinges being exemplary.

Figure 9:
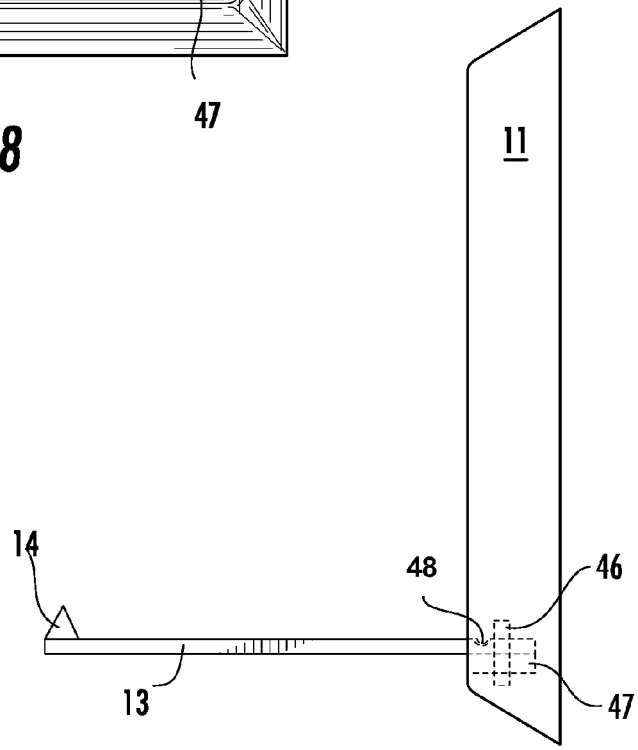
FIG. 9 is a side elevation of view of the trim plate of FIG. 8.

FIG. 9 is a side elevational view of the fourth embodiment of the trim plate 45 and again illustrates the hook arm 13, the lug 14, the pivot pin 46, and the bearing 47.

The embodiment illustrated in FIGS. 8 and 9 could also optionally include a lock 48 that helps prevent the arm 13 from pivoting in an undesired fashion from either the open or closed position or both. As in the other embodiments, the lock 48 can include a ball and detent lock, uses and examples of which are numerous in many mechanical devices, or a spring pin as described earlier.

The invention moderately increases the size of a trim plate as would be used for any standard electrical receptacle, network connection receptacle, antennae connection, light switch, medical gas terminal unit or other application that uses a trim plate for aesthetic dress or functional closure of a wall opening In the drawings and specification there has been set forth a preferred embodiment of the invention, and although specific terms have been employed, they are used in a generic and descriptive sense only and not for purposes of limitation.

The invention claimed is:

1. A trim plate comprising:
a substantially centered rectangular opening configured to fit around an electrical outlet;
a base plate;
a folding hook arm pivotally attached to said base plate;
a weight-bearing truss that supports said folding hook arm;
a first end of said weight bearing truss being pivotally connected to said hook arm at about the middle of said hook arm;
the second end of said truss being positioned in a primary slot in said base plate;
two secondary slots in said base plate positioned on either side of said primary slot; and
pins extending perpendicularly from the base plate end of said truss and fitting in said secondary slots for sliding therein whenever said hook arm is open or closed; and
a seat in said base plate for receiving said hook arm in its retracted position so that said hook arm and said truss are flush with said base plate when said arm is folded into said seat.

2. A trim plate according to claim 1 wherein said second end of said truss is positioned below said hook arm.

3. A trim plate according to claim 1 wherein said second end of said truss is positioned above said hook arm.

4. A trim plate according to claim 1 comprising two of said folding hook arms with one hook arm on either side of said rectangular opening.

5. A trim plate according to claim 1 further comprising a slot in said hook arm; and
a truss pin that moves in said slot in said hook arm.

6. A trim plate according to claim 1 further comprising:
a lug on the distal end of said hook arm; and
a seat for said lug in said base plate.

7. A trim plate according to claim 6 wherein said lug seat is in said arm seat.

8. A trim plate according to claim 2 wherein
said hook arm is pivotally attached in upper portions of said base plate; and
said second end of said truss includes a lock that maintains said truss and said hook arm in place when said hook arm is pivotally opened upwardly.

9. A trim plate according to claim 8 wherein said lock is a ball and detent lock.

10. A trim plate according to claim 8 wherein said lock is a spring pin.

* * * * *